Dec. 25, 1962   R. E. SMITH   3,069,686
CLIP RING PLIERS WITH OFFSET JAWS
Filed Dec. 14, 1960
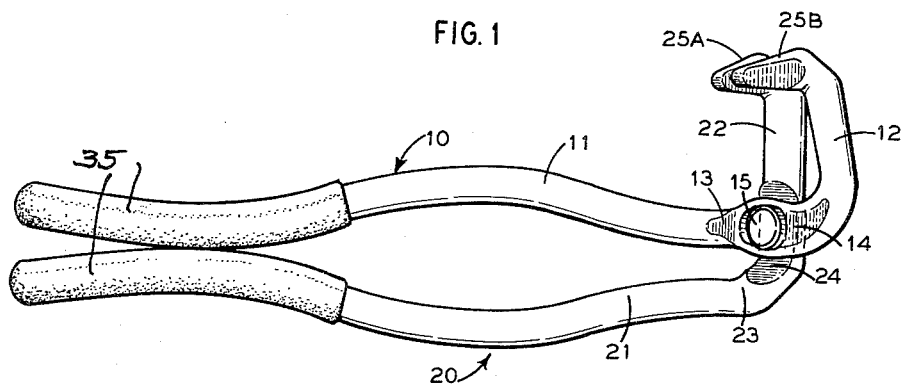
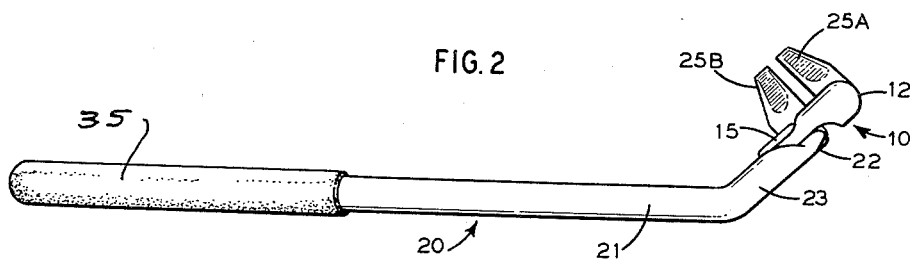
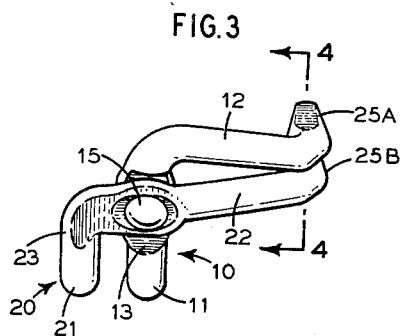
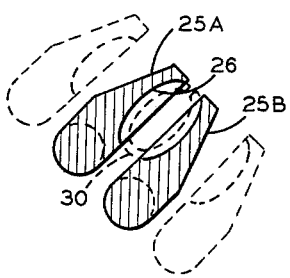
*INVENTOR.*
Randall E. Smith
BY
*Irving Seidman*
ATTORNEY United States Patent Office 3,069,686
Patented Dec. 25, 1962

3,069,686

CLIP RING PLIERS WITH OFFSET JAWS

Randall E. Smith, Ridgewood, N.J., assignor to Republic Fastener Products Corp., Saddlebrook, N. J., a corporation Filed Dec. 14, 1960, Ser. No. 75,851
9 Claims. (Cl. 1—220)

This invention relates to pliers and, more particularly, to a novel pliers construction particularly adaptable for positioning and closing clips securing seat covers to automobile seats.

In applying covers to automobile seats, and particularly in the case of custom fitted covers, the covering material is draped over the upper surface of the seat, drawn down over the front, back and side edges of the seat, turned underneath the bottom edges of the seat, and then clipped to the interior of the seat to hold the material smoothly and tightly over the outer surfaces of the seat. The clipping is effected by means of "hog" rings or clips and, to position and close these clips, the installer must reach beneath the seat, position the ring or clip, and close the ring or clip with a pair of pliers.

When the seats are located a reasonable distance above the floor, as in the case of older cars, no particular difficulty is encountered in installing the seat covers in the foregoing manner. Any minor inconvenience is due to the fact that the pliers, held beneath the seat, must be directed toward the outside of the seat, which make the manipulation of the pliers a little more difficult but not impossible so long as the installer can extend his arm beneath the seat.

However, with the trend toward lower cars, and particularly lower roofs, in order to obtain adequate head room, the seats have been moved down so that there is no longer sufficient clearance between the car floor and the lower edge of the seat for an installer to extend his arm under the seat. Consequently, it is difficult, if not impossible, to clip the seat covers to the inside surface of the seat. This is particularly true of the "sport car" model of one American motor car manufacturer of the late (1960) models of another manufacturer, and of certain late models of still other manufacturers.

The present invention is directed to a novel pliers construction for positioning and closing such "hog rings" underneath the seats of such models while the pliers are operated from outside the seat. More particularly, the pliers embodying the invention include a pair of relatively elongated elements, pivotally interconnected intermediate their ends in crossing relation, to form relatively longer handle means and relatively shorter jaw means.

The handle means are movable relatively to each other in what may be termed a first or handle movement plane. Just short of the pivot of the pliers, the handle means are bent out of this handle movement plane to lie in a common plane at an angle to the handle movement plane of the order of 45 degrees, and the pivot axis extends at an angle of 45 degrees to the handle movement plane and perpendicularly to this common plane.

The jaw means have their major extent lying in this common plane and extending at righ angles to the major length of the handle means, one of the jaw means being bent at right angles to the handle means in advance of the pivot and the other jaw means being so bent beyond the pivot.

The extreme ends of the jaw means are bent toward the handle means to form a pair of cooperating jaws suitably notched or recessed to "grasp" an open "hog" ring or clip. These jaws lie in a third, or jaw movement, plane which is perpendicular to the handle movement plane and to the mentioned "common" plane. In the jaw movement plane, the jaws are rearwardly directed toward the free ends of the handle means at an angle of the order of 45 degrees to the handle movement plane.

The pliers may thus be inserted beneath a seat with a "hog" ring grasped in the jaws and the handle movement plane substantially horizontal. In this orientation, the jaws extend outwardly and upwardly at an angle of the order of 45 degrees to the horizontal. The ring may thus be closed on a seat cover portion on the inside of the wall or skirt of a seat by "closing" the handle means.

For an understanding of the invention principles, reference is made to the following description of a typical embodiment thereof as illustrated in the accompanying drawing.

In the drawing:

FIG. 1 is a plan view of pliers embodying the invention;

FIG. 2 is a side elevation view thereof;

FIG. 3 is a front end elevation view thereof; and

FIG. 4 is a sectional view through the jaws taken on the line 4—4 of FIG. 3, looking in the direction of the arrows.

Referring to the drawings, the pliers embodying the invention comprises a pair of relatively elongated elements 10 and 20 pivotally interconnected in crossing relation by suitable pivot means such as a headed rivet 15. Elements 10 and 20 are formed of a suitable strong and rigid material such as, for example, cold rolled steel rod of generally circular cross section.

Each element 10 and 20 includes relatively long handle means such as 11 and 21, respectively, extending in one direction from pivot 15, and relatively short jaw means, such as 12 and 22, respectively, extending generally in the opposite direction from pivot 15.

Starting from its outer end, handle means 11 is first curved toward handle means 21, then away from the latter, and then again toward handle means 21, handle means 11 extending substantially parallel to handle means 21 immediately in advance of pivot 15. Handle means 21 is curved in a similar, mating or mirror manner, except that, at pivot 15, handle means 21 is bent to extend across handle means 11 at nearly a right angle to the latter as measured in the closed position of the pliers shown in FIGS. 1, 2 and 3.

For the major portion of their lengths, handle means 11 and 21 lie in or parallel to their plane of relative movement, or the handle movement plane, in the same manner as do ordinary plier handles. However, just in advance of pivot 15, handle means 11 and 21 are bent at an angle of the order of 45 degrees to the handle movement plane, to form oblique portions as indicated at 13 and 23 respectively. The axis of pivot 15 extends normal to the common plane of portions 13 and 23 and thus at an angle of the order of 45 degrees to the handle movement plane.

At pivot 15, the elements 10 and 20 are flattened, as at 14 and 24, respectively to provide adequate bearing surfaces at the pivot. Element 10 extends generally rectilinearly of handle means 11 across pivot 15, whereas element 20 is bent at nearly a right angle to handle means 21 as it extends across pivot 15. This results in the jaw means 12 having an angular shape between pivot 15 and jaw 25A, whereas jaw means 22 is substantially rectilinear between pivot 15 and jaw 25B.

The major extents of jaw means 12 and 22 lie parallel to the common plane which is at an angle of the order of 45 degrees to the handle movement plane, with jaw means 22 being inward of jaw means 12. The jaws 25A and 25B extend rearwardly or inwardly at substantially a 90 degree angle to the major extents of the respective jaw means 12 and 22, and outwardly at an angle of the order of 45 degress to the handle movement plane.

Jaws 25A and 25B are tapered and flattened so as to have a substantially pyramidal shape, and the facing surfaces of the jaws have opposing arcuate recesses 26 for receiving an open "hog" ring or clip 30.

In operation, jaws 25A and 25B are opened, with their opposing faces remaining substantially parallel to receive an open "hog" ring 30 grasped in recesses 26. The jaws are then inserted beneath a seat with handle means 11, 21 remaining in a substantially horizontal plane. When the clip 30 is at the proper location inside the seat skirt, handle means 11, 21 are closed on each other to close the "hog" ring and lock the seat cover in place. Operation of the pliers is facilitated by grips 35, of rubber or plastic, on the outer portions of handles 11, 21.

While a specific embodiment of the invention has been shown and described in detail to illustrate the application of the invention principles, it will be understood that the invention may be embodied otherwise without departing from such principles.

What is claimed is:

1. Pliers, for clinching open ring clamps, comprising, in combination, a pair of relatively elongated elements; and pivot means pivotally interconnecting said elements in crossing relation intermediate their ends; each element including a relatively longer handle means extending in one direction from said pivot means and a relatively shorter jaw means extending in the other direction from said pivot means; said handle means including grip portions lying in substantially the plane of movement of said handle means and oblique portions lying substantially in a common plane extending at an acute angle to said plane of movement; said oblique portions lying between said grip portions and said pivot means; said pivot means interconnecting said elements at substantially the ends of said oblique portions; said jaw means lying in laterally spaced relation to each other in such common plane and extending substantially perpendicular to the major extent of said oblique portions; said jaw means including facing jaws at the free ends thereof extending toward the free ends of said handle means.

2. Pliers as claimed in claim 1 in which said elements are round metal rods having flattened cooperating bearing surfaces at their pivotal interconnection.

3. Pliers as claimed in claim 1 in which said jaws have facing substantially flat faces formed with facing arcuate recesses to grasp the open ring clamps.

4. Pliers, for clinching open ring clamps, comprising, in combination, a pair of relatively elongated elements; and pivot means pivotally interconnecting said elements in crossing relation intermediate their ends; each element including a relatively longer handle means extending in one direction from said pivot means and a relatively shorter jaw means extending in the other direction from said pivot means; said handle means including grip portions lying in substantially the plane of movement of said handle means and oblique portions lying substantially in a common plane extending at an acute angle to said plane of movement; said oblique portions lying between said grip portions and said pivot means; said pivot means interconnecting said elements at substantially the ends of said oblique portions and having its axis substantially perpendicular to such common plane; said jaw means lying in laterally spaced relation to each other in such common plane and extending substantially perpendicular to the major extent of said oblique portions; said jaw means including facing jaws at the free ends thereof extending substantially perpendicular to such common plane.

5. Pliers, for clinching open ring clamps, comprising, in combination, a pair of relatively elongated elements; and pivot means pivotally interconnecting such elements in crossing relation intermediate their ends; each element including a relatively longer handle means extending in one direction from said pivot means and a relatively shorter jaw means extending in the other direction from said pivot means; said handle means including grip portions lying in substantially the plane of movement of said handle means and oblique portions lying substantially in a common plane extending at an acute angle to said plane of movement; said oblique portions lying between said grip portions and said pivot means; said pivot means interconnecting said elements at substantially the ends of said oblique portions and having its axis substantially perpendicular to such common plane; said jaw means lying in laterally spaced relation to each other in such common plane and extending substantially perpendicular to the major extent of said oblique portions; said jaw means including facing jaws at the free ends thereof extending substantially perpendicular to such common plane toward the free ends of said handle means.

6. Pliers as claimed in claim 5 in which said jaws have facing substantially flat faces formed with facing arcuate recesses to grasp the open ring clamps.

7. Pliers as claimed in claim 5 in which said jaws are substantially pyramidal in shape tapering toward their free ends.

8. Pliers as claimed in claim 5 in which said jaws are substantially pyramidal in shape tapering toward their free ends and having facing substantially flat faces formed with facing arcuate recesses to grasp the open ring clamps.

9. Pliers as claimed in claim 5 including grip sleeves covering the outer extents of said grip portions.

References Cited in the file of this patent

UNITED STATES PATENTS

| | | |
|---|---|---|
| 173,977 | Lyman | Feb. 22, 1876 |
| 2,121,247 | Hooker | June 21, 1938 |
| 2,354,303 | Carver | July 25, 1944 |
| 2,562,097 | Heuer | July 24, 1951 |